United States Patent [19]

Kramer et al.

[11] Patent Number: 4,700,490
[45] Date of Patent: Oct. 20, 1987

[54] COMPASS

[75] Inventors: Melvin G. Kramer; Marlin D. Iden, both of Riverton, Wyo.

[73] Assignee: The Brunton Company, Riverton, Wyo.

[21] Appl. No.: 891,059

[22] Filed: Jul. 31, 1986

Related U.S. Application Data

[63] Continuation of Ser. No. 692,648, Jan. 16, 1985, abandoned.

[51] Int. Cl.[4] .............................................. G01C 17/06
[52] U.S. Cl. ..................................... 33/355 D; 33/345
[58] Field of Search ................. 33/355 R, 355 D, 356, 33/357, 345, 352, 364; 335/303; 354/64; 200/340, 302.2, 159 B

[56] References Cited

U.S. PATENT DOCUMENTS

| 2,108,263 | 2/1938 | L'Abee-Lund | 33/355 |
| 2,171,755 | 9/1939 | Langsner | 33/355 |
| 2,294,355 | 8/1942 | Hull | 33/355 |
| 3,191,306 | 6/1965 | Kierans | 33/355 |
| 3,217,420 | 11/1965 | Dinsmore | 33/355 |
| 3,502,013 | 3/1970 | Shimoda | 354/64 |
| 3,585,728 | 6/1971 | Ogg | 33/364 |
| 3,613,251 | 10/1971 | Fitzpatrick et al. | 33/355 |
| 4,031,348 | 6/1977 | Eberhardt | 200/302.2 |
| 4,055,902 | 11/1977 | Jolley et al. | 33/356 |
| 4,088,855 | 5/1978 | Emery | 200/302.2 |
| 4,175,333 | 11/1979 | Kramer | 33/355 |
| 4,420,665 | 12/1983 | Conrad | 200/302.2 |

FOREIGN PATENT DOCUMENTS

| 2758 | 1/1878 | Fed. Rep. of Germany | 33/355 |
| 2511373 | 9/1975 | Fed. Rep. of Germany | 33/355 |
| 22598 | of 1915 | United Kingdom | 33/355 |

Primary Examiner—Charles Frankfort
Assistant Examiner—Patrick R. Scanlon
Attorney, Agent, or Firm—John E. Reilly

[57] ABSTRACT

A compass which is self-compensating for dip of its pointer arms irrespective of variances in the earth's magnetic forces at different geographical locations includes a magnet disposed beneath respective proximal portions of the pointer arms so that the pointer arms are parallel to the magnetic field of the magnet, with the magnet constructed to be counterbalancing with regard to the earth's magnetic fields. In a preferred embodiment, the magnet comprises a plastic disk with magnetic particles embedded therein, the disk having a chordal portion removed therefrom immediately beneath one pointer arm, and a damper pan assembly is controlled by a lift arm to selectively dampen the movement of the pointer arms.

10 Claims, 3 Drawing Figures

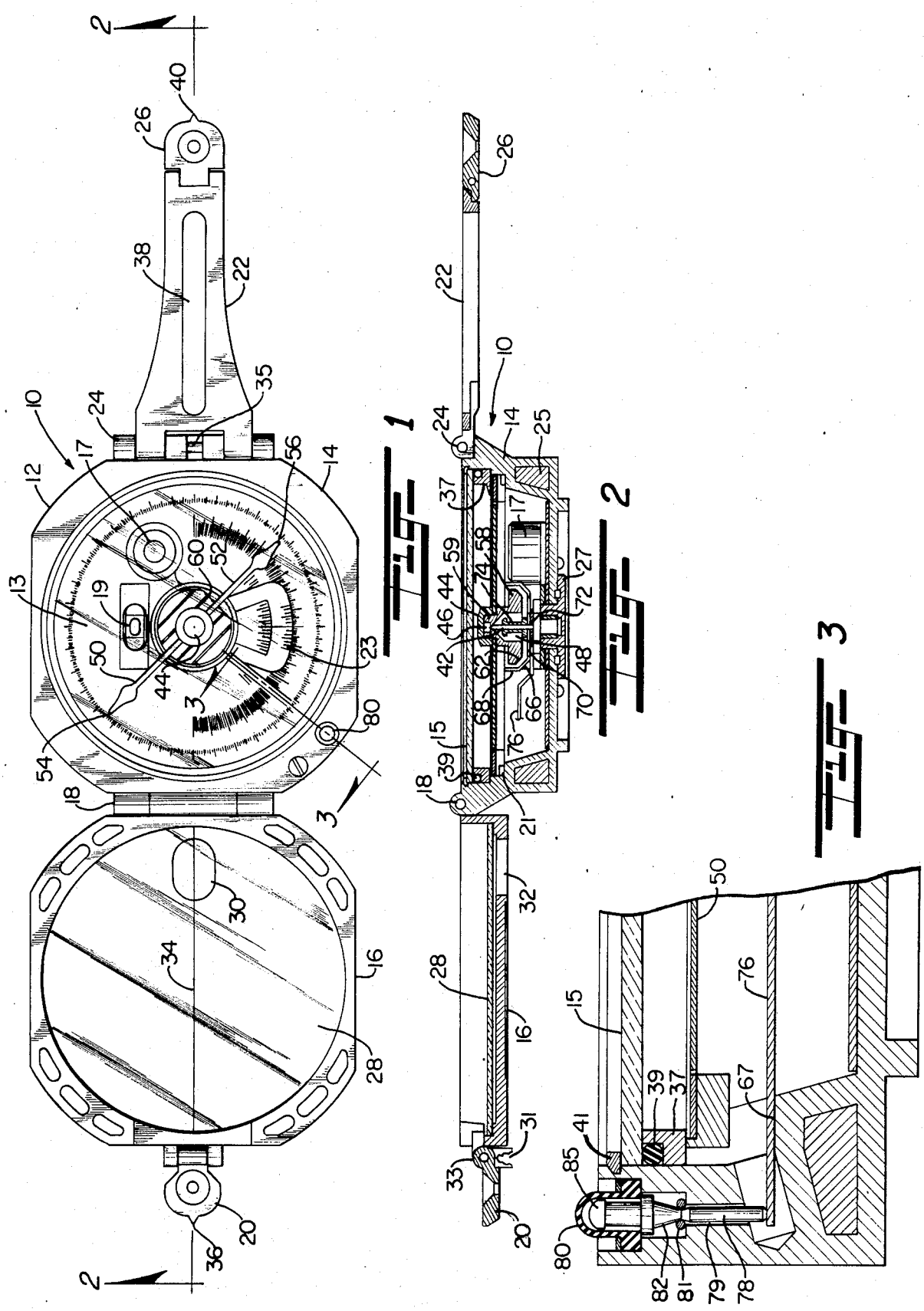

… …

COMPASS

This application is a continuation application of Ser. No. 692,648, filed Jan. 16, 1985 and now abandoned, for COMPASS, invented by Melvin G. Kramer et al.

This invention relates to a compass; and more particularly relates to a novel and improved compass which is self-compensating for dip of the compass direction pointer caused by varying effects of the earth's magnetic field in different parts of the world, and which additionally possesses improved pointer dampening means for accurate directional readings.

BACKGROUND AND FIELD OF INVENTION

It is well-known that the earth's magnetic field varies with the location of measurement in different parts of the world. Because of these variations, it is difficult, if not impossible, to employ standard compasses universally without first making time-consuming and intricate modifications of these instruments. Specifically, because of the vertical component of the earth's magnetic field, a compass needle which is horizontally balanced at one location on earth can dip from the horizontal plane at another location. Such dipping can cause severe inaccuracy or inoperability of the instrument. A common practice to overcome this unwanted condition has been to add weight, generally in the form of a coiled wire, to one arm of the compass needle to return the entire needle to a generally horizontal plane. To accomplish this, however, a user must break the integrity of the compass housing and most carefully add weight to the delicate needle. Such activity is inconvenient, time-consuming, possibly inaccurate, and, if damage to the instrument occurs, costly.

In U.S. Pat. No. 4,175,333, owned by the assignee of the instant application, a compass is disclosed wherein dip or tipping of the direction pointer is compensated for to some extent by offsetting the pointer arms beneath the pivot point. Such positioning enables the earth's magnetic and gravitational forces, in relation to the pivot point, to be optimally forceful in a manner much like that of the center of gravity in general balance considerations thereby enhancing horizontal plane maintenance of the pointer arm.

The compass which is the subject of the instant invention provides automatic compensation for tipping of the pointer through counterbalancing of the magnetic forces in relation to the earth's magnetic force, resulting in an instrument wherein the pointer remains in a generally horizontal plane irrespective of geographical location. The instant invention additionally overcomes effective dampening and vibration problems associated with unwanted pointer movement during directional reading and recordation.

SUMMARY OF THE INVENTION

Accordingly, it is an object of the instant invention to provide for an improved magnetic compass usable in different parts of the world without the necessity of rebalancing the pointer arm when geographical location changes.

It is a further object of the instant invention to provide a magnetic compass comprised of an assembly which includes a magnet counterbalanced in relation to the earth's magnetic field irrespective of geographical location to thereby maintain the pointer arm in a generally horizontal plane.

Yet another objective of the instant invention is to provide an improved magnetic compass comprised of an assembly which can include dampener means to effectuate positive and rapid pointer arm stabilization during compass readings.

These and other objectives will become apparent in the description which follows.

In accordance with the instant invention, a compass housing includes a pivot member projecting upwardly from the floor of said housing. Diametrically opposed pointer arms are pivotally mounted with respect to the pivot member, and a magnet is disposed beneath respective proximal portions of the pointer arms, the pointer arms extending in a direction parallel to the magnetic field of the magnet. The magnet is constructed to be counterbalancing with respect to the earth's magnetic field by establishing a reduced weight in a portion of the magnet to thereby compensate for or counterbalance the forces of the earth. Concurrently, the magnet is disposed beneath the pivot point of the assembly, thereby taking optimum advantage of the earth's force concentrations as earlier related and as discussed in the earlier-referenced U.S. Pat. No. 4,175,333.

In a preferred embodiment, the magnet comprises a molded plastic disk with magnetic particles embedded therein, and a chordal portion is removed to effectively counterbalance the forces of the earth. This flatted surface is, along with the low center of gravitational and vertical magnetic force sites on the disk which are located well beneath the tip of the pivot member, responsible for maintaining the pointer arms in a generally horizontal plane irrespective of geographical location. An upper extension of the magnetic disk supports the pointer arms, and a cap is surmounted on the upper extension to retain the pointer arms in place. The instant compass includes a damper pan assembly disposed beneath the pointer assembly having a central member which can be lifted to raise the pointer assembly off of the pivot member and to stabilize and support the pointer arms for compass reading.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is a top plan view of a preferred form of compass in accordance with the present invention;

FIG. 2 is a side elevation view partially in section of the compass of FIG. 1; and FIG. 3 is an exploded side elevation view partially in section of the compass of FIG. 1 taken along line 3—3 thereof.

DETAILED DESCRIPTION OF THE PREFERRED EMBODIMENT

Referring to FIGS. 1 and 2, a compass 10 is shown in the form of a portable or hand-held instrument. The housing 12 is broadly comprised of an annular body 14 with a transparent top 15 of a clear glass or plastic material, and a cover 16 is hinged as at 18 to one sidewall of the body 14 for movement between an open position as shown and a closed position superimposed on the body 14. A sight 20 is pivoted as at 33 to the outer end of the cover, and a jaw-like clasp 31 is pivotally secured to the pivot 33. A sight arm 22 is hinged as at 24 about a hinge pin 35 to the diametrically opposed side of the body 14 and has a sight 26 at its outer end. The cover 16 is provided with a mirror 28 on its inner surface which, as viewed in FIG. 1, is disposed in facing relation to the sight arm 22. The mirror 28 has an offset window 30 aligned with an opening 32 in the wall of the cover 16 to permit viewing therethrough. In addition, a center line 34 is formed on the surface of the mirror 28 and the viewing window 30 which is aligned with a central tip 36 on the sight 20. In turn, the sight arm 22 has an elongated slot 38 which is formed symmetrically within said arm 22 and is similarly aligned with the tip 40 on the end of the sight 26. The sight arm 22 is foldable over the body 14, and the cover 16 can be closed over the sight arm 22 and body 14 with the tip 36 pivoted inwardly within the cover 16 such that the clasp 31 is engageable with the hinge pin 35 to retain the cover in the closed position.

A single unit comprising a round level 17 and a long level 19 with vernier 23 is situated above the bottom plate 13 of the annular body 14 and is rotatable from beneath via a lever 27 disposed beneath the floor of the annular body 14. An azimuth ring 21 is provided on the periphery and a weight in the form of a zinc insert 25 is disposed within the wall of the annular body 14. The top 15 is firmly seated against a seat 39 disposed in an O-ring seal retainer 37, the top 15 being fixed in place by a suitable snap ring 41 which is inserted in a groove along the upper wall of the body 14.

In the preferred form, a pivot pin 42 projects upwardly from the center of the floor of the body 14. The upper extremity of the pivot pin 42 supports a pointer assembly comprised of a center cap 44 of inverted cup-shaped configuration and a jewel 46 disposed centrally within the cap 44. Two diametrically opposed pointer arms 50, 52 project from the lower end of the cap 44 to terminate in respective needle tips 54, 56. Disposed in closely spaced relation beneath respective proximal portions of the pointer arms 50, 52 is an annular magnetic disk 58 which has an upper annular extension 59 affixed to the underside of the cap 44 and suspended therefrom. The jewel 46 is positioned at the upper extremity of the extension 59 within the cap 44 to rest on the upper tip of the pivot 42. The disk 58 has a chordal or flat surface portion 60 in its outer periphery and a tapered undersurface 62. The pointer arm 52 which points to the north is aligned to extend radially across the center of the flatted surface 60, as viewed from above, to offset or counterbalance the effect of tipping caused by the earth's magnetic field. In accordance with conventional practice, construction of the disk 58 involves the blending of magnetic particles in plastic and casting in a mold in the presence of a high strength magnetic field whereby the particles become oriented with respect to the earth's magnetic field. After the molded disk 58 has cured, it is again subjected to a high strength magnetic field to intensify the magnetization of the disk. Depending on size restrictions of the instrument, the disk 58 is formed with the tapered undersurface 62, shown in FIG. 2, to conform to the shape of the damper pan 66 hereinafter described.

In the preferred embodiment, the damper pan assembly is disposed beneath the pointer assembly, as shown in FIG. 2, and comprises a damper pan 66 having an upwardly projecting outer wall 68 and a floor or base 70 having a central orifice 72 therethrough. A central sleeve 74 concentric with the central orifice 72 of the base 70 projects upwardly through the hollow interior of the pan 66 a distance greater than the upward projection of the outer wall 68. The pivot pin 42 extends through the orifice 72 of the base 70 and the sleeve 74 to support the jewel 46. The damper pan assembly further comprises externally accessible lift means to effectuate selected upward movement of the sleeve 74 to lift the pointer assembly and jewel 46 off of the pivot 44. In the embodiment here shown, the lift means comprises a lift arm 76 extending from beneath the base 70 of the pan 66 to rest on a flat wall surface 67 which is spaced inwardly from the outer periphery of the annular body 14. As shown in FIG. 3, a vertical lift pin 78 is slidably mounted in a bore 79 in the body 14 and a bellows 80 extends upwardly through the upper edge of the annular body 14. The lift pin 78 engages a free end of the arm 76 outwardly of the surface 67 and is suspended in the bore by a rubber seal 81 which engages an upper divergent or conical portion 82 on the pin. Depression of the bellows 80 against the upper rounded end 85 of the pin 78 causes the pin 78 to move downwardly against the arm 76 and pivot the arm 76 about the surface 67 thereby lifting the damper pan 66 into engagement with the magnetic disk 58 and in turn to lift the sleeve 74 into engagement with the conically shaped undersurface of the upper extension 59 of the magnet 58 thereby lifting the jewel 46 off of the pivot 42. When the bellows 80 is released, the lift pin 78 is returned or raised to its original position under the urging of the seal 81 against the conical portion 82 and coupled with the weight of the sleeve 74 and damper pan 66 will cause the lift arm 76 to be lowered or returned to its original horizontal disposition. When the bellows is released, the lift pin 78 is raised under the urging of the seal 81.

As earlier related, the instant compass automatically compensates for dip or tipping of the pointer arms from a generally horizontal plane as caused by the earth's magnetic field. This automatic compensation is accomplished by the absent chordal or flatted portion 60 of the magnetic disk 58 coupled with the pointer arm 52 being disposed across the midsection of the flatted portion 60 in offset relation beneath its pivot point. The chordal portion has the comparable effect on the pointer arms 50, 52 of adding weight to the diametrically opposed portion of the disk so as to counterbalance the effect of the earth's magnetic field and maintain the pointer arms in a generally horizontal plane. The extent or depth of the chordal portion to be removed is, of course, dependent upon the latitude or magnetic force to be counterbalanced, a selected portion being removed until a generally horizontal plane is achieved by the pointer arms. Additionally, spacing of the disk 58 beneath the pivot point of the pointer arms 50, 52 minimizes the effect of the earth's gravitational and magnetic forces, thereby contributing to the horizontal stability of the pointer arms 50, 52.

Operation of the damper pan assembly is effectuated by depressing the bellows 80, causing the arm 76 to lift the pointer assembly off of the pivot pin 42 as described. The effect realized from movement of the sleeve 74 is a stabilization of the pointer arms 50, 52 for faster reading results. When pressure on the bellows 80 is removed, the damper pan assembly returns to its original position.

It will be evident that the magnetic disk as formed with the flatted surface 60 of the disk disposed between the north-pointing arm 56 is specifically intended for use in the northern hemisphere. Most desirably, if the compass is being manufactured for use in the southern hemisphere the flatted surface portion should then be disposed to underlie the south-pointing arm 54. In either case, it has been found that the effects of the vertical component of the earth's magnetic field on the pointer arms are greatly minimized by the suspension of the arms and the annular magnetic disks in the manner described so as to obviate adjustment in the field. Materials utilized in constructing the instant instrument are those as would be evident to the skilled artisan, and can include plastic or other non-magnetic materials which will not interfere with the operation of the instrument.

While the embodiment shown is portable and hand-held as described, it is to be understood that the present invention is readily conformable for use with various sizes and types of compasses or transits. Thus, the embodiment here shown is meant to be descriptive and not limiting, with the scope of the invention being defined in the claims which follow.

We claim:

1. In a compass wherein a pivot member projects upwardly from the base of a housing and a pointer assembly includes diametrically opposed pointer arms mounted on said pivot member, the improvement comprising:

an annular magnetic disk composed of a molded plastic material having magnetic particles embedded therein oriented in the direction of the earth's magnetic field, means for suspending said magnetic disk from said pivot member so that said disk is spaced beneath respective proximal portions of said pointer arms, said pointer arms extending in a direction parallel to the magnetic field of said magnetic disk, said magnetic disk having a chordal portion removed from said disk beneath one of said pointer arms so that said disk is weighted in a direction to counterbalance the vertical component of the magnetic forces of the earth.

2. In a compass according to claim 1, wherein said pointer arms terminate in respective needle tips, and said suspending means includes an upward annular extension of said disk and a cap at the upper end of said extension having a jewel therein positioned on said pivot member.

3. In a compass including a pivot member projecting upwardly through a housing, a pointer assembly including diametrically opposed pointer arms mounted on said pivot member and a cover mounted in hinged relation to said housing and movable into a closed position against a wall of said housing, the combination therewith comprising:

a. an annular magnetic disk suspended from said pointer assembly and spaced beneath respective proximal portions of said pointer arms, said pointer arms extending in a direction parallel to the magnetic field of said disk said magnetic disk having a chordal portion removed therefrom beneath one of said pointer arms;

b. a damper pan disposed beneath said pointer assembly provided with a central opening through which said pivot member extends, and a hollow sleeve slidably disposed on said pivot member; and c. lift means including a pivotal lift arm extending radially from beneath said damper pan and said sleeve, and a manually depressible control pin mounted in the wall of said housing including a lower end engageable with said pivotal lift arm and means having an upwardly directed bellows member at an upper end of said control pin projecting upwardly beyond the wall of said housing causing said control pin to pivot said lift arm whereby to raise said sleeve into engagement with said pointer assembly when said cover is in the closed position, and spring return means associated with said control pin for urging said control pin in a direction lifting the lower end of said control pin away from engagement with said lift arm when said cover is moved away from the closed position.

4. In a compass according to claim 3, said spring return means defined by a downwardly tapered surface portion on said control pin between said upper and lower ends thereof, and a rubber-like element in surrounding relation to said tapered surface portion urging said control pin in an upward direction.

5. In a compass according to claim 3, said disk including an upper annular extension of said disk disposed in outer spaced concentric relation to said sleeve and to said pivot member, a cap positioned on said upper extension including a jewel supported on said pivot member with said pointer arms extending from said cap in spaced relation beneath said jewel.

6. In a compass according to claim 5, said pointer arms being flat and extending horizontally away from said cap, said sleeve engageable with said upper extension of said disk in response to being advanced by said lift arm.

7. In a compass according to claim 6, said sleeve having an upper convex end surface engageable with a complementary concave undersurface of said upper extension.

8. In a compass according to claim 3, said housing including an annular body with an upper wall surface, and a transparent top disposed in sealed relation to said upper wall surface.

9. In a compass according to claim 8, said cover provided with a sight pivotal at one end thereof, and a sight arm hinged to said body in diametrically opposed relation to said cover, said cover being foldable into a closed position over said housing and said sight arm, and means on said sight for releasably connecting said cover in the closed position to said sight arm.

10. In a compass according to claim 9, said sight arm including a hinge member, and said releasable connecting means on said sight defined by a clasp pivotally connected to said sight and engageable with said hinge member when said cover is folded into a closed position with respect to said housing.

* * * * *